United States Patent
Hirota et al.

(10) Patent No.: US 9,479,665 B2
(45) Date of Patent: Oct. 25, 2016

(54) IMAGE FORMING DEVICE, IMAGE FORMING METHOD AND RECORDING MEDIUM THAT ALLOW APPLICATION TO RUN

(71) Applicant: KYOCERA Document Solutions Inc., Osaka (JP)

(72) Inventors: Masato Hirota, Osaka (JP); Tomihito Doi, Osaka (JP); Koji Ikawa, Osaka (JP); Ayaka Ikejima, Osaka (JP); Satoshi Imai, Osaka (JP); Daijiro Kitamoto, Osaka (JP); Makoto Kowaka, Osaka (JP); Kyota Mitsuyama, Osaka (JP); Takashi Murakami, Osaka (JP); Yosuke Nakazato, Osaka (JP); Tomonori Naota, Osaka (JP); Kentaro Okamoto, Osaka (JP); Minoru Takahashi, Osaka (JP); Wataru Tsukuda, Osaka (JP); Katsuji Furushige, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/726,525

(22) Filed: May 30, 2015

(65) Prior Publication Data

US 2015/0350472 A1    Dec. 3, 2015

(30) Foreign Application Priority Data

May 30, 2014  (JP) .................................. 2014-113089

(51) Int. Cl.
*H04N 1/00* (2006.01)
*G06F 3/12* (2006.01)
*G06K 15/02* (2006.01)

(52) U.S. Cl.
CPC ................................ *H04N 1/00962* (2013.01)

(58) Field of Classification Search
None
See application file for complete search history.

(56) References Cited

U.S. PATENT DOCUMENTS

| 2007/0050471 A1* | 3/2007 | Patel ........................ G06F 9/54 709/217 |
| 2007/0095902 A1* | 5/2007 | Fukasawa ............. G06F 21/445 235/382 |

(Continued)

FOREIGN PATENT DOCUMENTS

JP     2002-082806 A    3/2002

*Primary Examiner* — Beniyam Menberu
(74) *Attorney, Agent, or Firm* — Hawaii Patent Services; Nathaniel K. Fedde; Kenton N. Fedde

(57) ABSTRACT

Provided is an image forming device includes a control circuit having (1) a device control platform managing a hardware resource on an operating system, (2) a standard application execution part executing a standard application utilizing the hardware resource under the control of the device control platform, (3) an extended application platform with a standard function service that allows for a utilization of a function of the standard application executed by the standard application execution part, and (4) an install service adding, without having to change a configuration of a standard firmware, an interface in order to cope with a function that is not available and allowing for utilization thereof.

3 Claims, 7 Drawing Sheets

(56) References Cited

U.S. PATENT DOCUMENTS

| | | | | |
|---|---|---|---|---|
| 2011/0038005 A1* | 2/2011 | Ochiai | ............... | G03G 15/5075 358/1.15 |
| 2011/0041144 A1* | 2/2011 | Araki | ....................... | G06F 9/541 719/328 |
| 2011/0145843 A1* | 6/2011 | Ohhashi | .............. | G06F 9/44526 719/328 |
| 2011/0283087 A1* | 11/2011 | Watanabe | ............... | G06F 9/547 712/30 |
| 2011/0283282 A1* | 11/2011 | Kobayashi | ......... | H04N 1/00344 718/100 |
| 2011/0321046 A1* | 12/2011 | Adegawa | ............... | G03G 15/50 718/100 |
| 2014/0016154 A1* | 1/2014 | Ohmori | ............. | H04N 1/00278 358/1.13 |

* cited by examiner

IMAGE FORMING DEVICE, IMAGE FORMING METHOD AND RECORDING MEDIUM THAT ALLOW APPLICATION TO RUN

INCORPORATION BY REFERENCE

This application is based on and claims the benefit of priority from Japanese Patent Application No. 2014-113089 filed on May 30, 2014, the contents of which are hereby incorporated by reference.

BACKGROUND

The present disclosure relates to an image forming device, an image forming method, and a recording medium, and in particular to an image forming device, an image forming method, and a recording medium that allow an application to run.

There have been provided pieces of application software (hereinafter which is simply referred to as "application") which are capable of being installed, for running, on an MFP (Multifunctional Peripheral) that has an ability to print out documents and images and an image forming device such as a printer or the like.

These applications makes it possible to provide functions including, for example, PDF creation, business card management, and accounting book management in an additional manner to the image forming device. In addition, these applications allow for an association between the image forming device and a camera or the like.

A typical technology describes that common parts of these applications are grouped as application and common system services, the application service, the common system services, and a generic operating system constitute a platform, and on the resulting platform is mounted with a printer application, a copy application, and other applications.

SUMMARY

An image forming device according to an embodiment of the present disclosure includes a control circuit. The control circuit has a device control platform, a standard application execution part, an extended application platform, and an install service. The device control platform manages a hardware resource on an operating system. The standard application execution part executes a standard application utilizing the hardware resource under the control of the device control platform. The extended application platform includes an extended application management part. The extended application management part manages and executes a standard function service that allows for a utilization of a function of the standard application executed by the standard application execution part, an extended function service that allows for utilizing the hardware resource, and an extended application platform having an extended application management part that manages and executes an extended application that is capable of calling the standard function service and the extended function service. The install service adds, without having to change a configuration of a standard firmware, an interface that serves as a function that is not available from the standard function service to the extended function service in order that the resulting extended function service is available from the extended application platform.

An image formation method according to an embodiment of the present disclosure is implemented on an image forming device including a hardware resource. The image formation method includes: managing the hardware resource on an operating system; executing a standard application that utilizes the hardware resource being managed; managing and executing an extended application that allows for utilizing the hardware resource by allowing for utilizing a function of the standard application under execution; and adding and utilizing an interface, without having to change a configuration of a firmware, in order to cope with a function that is not available.

A non-transitory computer readable recording medium according to an embodiment of the present disclosure stores a control program executable by the image forming device. The control program causes the image forming device to: manage the hardware resource on an operating system; execute a standard application that utilizes the hardware resource being managed; manage and executed an extended application that allows for utilizing the hardware resource by allowing for utilizing a function of the standard application under execution; and add and utilize an interface, without having to change a configuration of a firmware, in order to cope with a function that is not available.

DETAILED DESCRIPTION

Exemplary Embodiment

System Configuration of Image Forming Device

Figure 1:
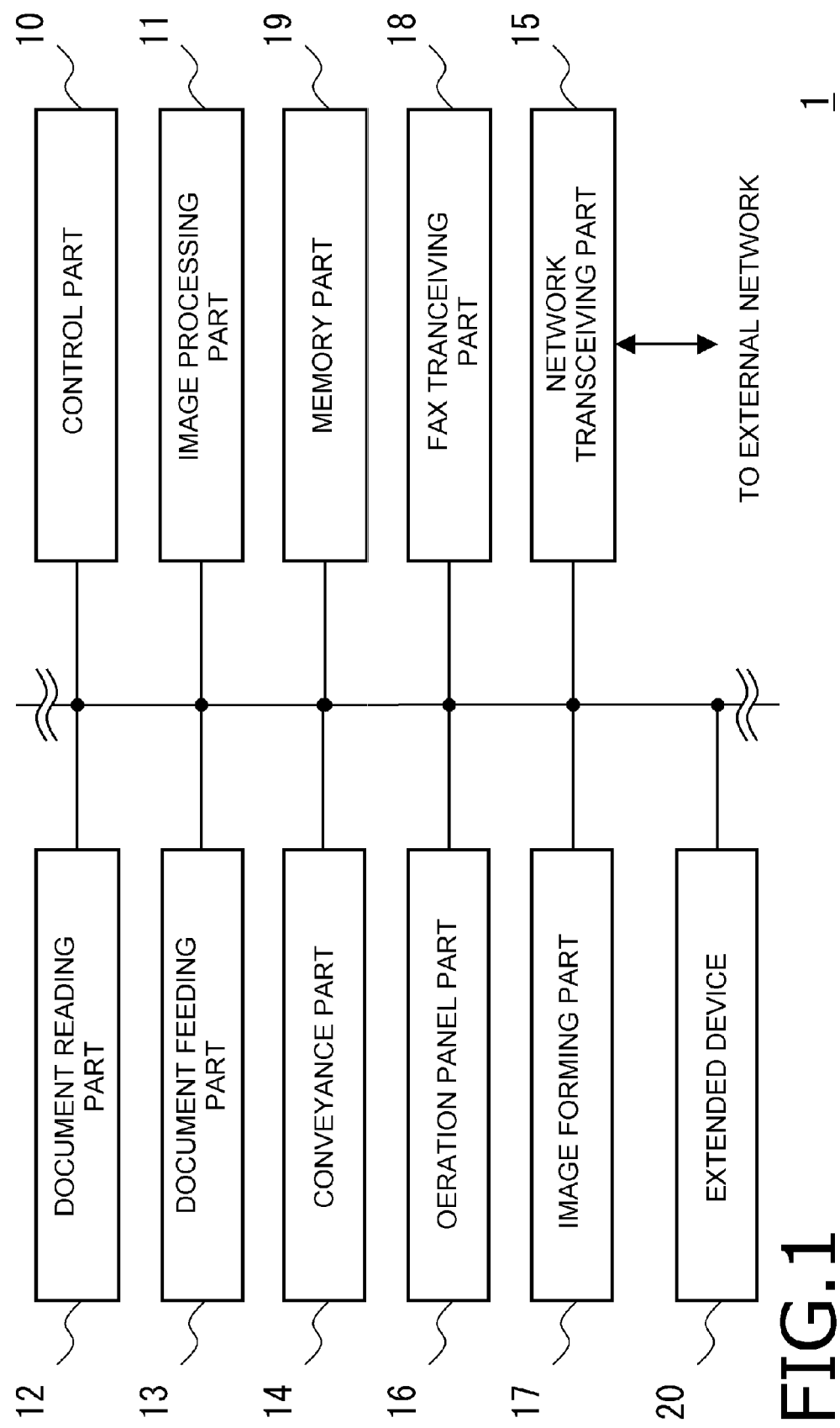
FIG. 1 illustrates a system configuration of an image forming device according to an exemplary embodiment of the present disclosure.

First of all, with reference to FIG. 1, a system configuration of an image forming device 1 according to an exemplary embodiment of the present disclosure will be described. The image forming device 1 includes a control part 10 to which are connected a control part 10, an image processing part 11, a document reading part 12, a document feeding part 13, a conveyance part 14, a network transceiving part 15, an operation panel part 16, an image forming part 17, a FAX transceiving part 18, a memory part 19, an extended device 20, and the like. These parts are under the control of the control part 10.

The control part 10 is an information processing circuit. The control part 10 reads out a control program from the memory part 12, develops this control program, and runs the resulting control program. Thereby, each part of a function block that will be detailed later is brought into operation. In addition, depending on an instruction signal that is inputted from an external terminal or the operation panel part 16, the control part 10 performs a total control of the image forming device 1.

The image processing part 11 is a control operation circuit. The image processing part 11 executes a specific image processing for each of various kinds of image data sets. Examples of the specific image processing include scaling images, density adjustment, gradation adjustment, and image improvement. The image processing part 11 stores an image, as a printing data set, which is red by the document reading part 12 on the memory part 19. At this stage, it is possible for the image processing part 11 to convert the printing data set into one unit of PDF format, TIFF format, or the like.

The document reading part 12 is a circuit that reads a set documentation.

The document feeding part 13 is a mechanism that feeds the document to be read by the document reading part 12.

The conveyance part 14 is mechanism that carries a paper from a paper feeding cassette and carries the paper on which an image is formed at the image forming part 17 to a stack tray. The image forming part 17 is a circuit that forms an image on the recording paper from a data set according to a user's output instruction, the data set being stored on the memory part 19, being red by the document reading part 12, or acquired from an external terminal.

The network transceiving part 15 is a network connecting circuit. The network transceiving part 15 transceives data sets through a data communication line and transceives sound signals through a telephone voice line. The network transceiving part 15 may be connected, via a network, to external terminals such as PCs (personal computers), smart phones, PDAs (Personal Data Assistants) and cell phones, and servers or the like.

The operation panel part 16 is a circuit that is provided with an indication part, operation mode switching buttons including, for example, a ten-key button, start button, cancel button, copy button, FAX transmission button, send button and scanner button, and buttons or an input part of a touch screen functionality both of which are for giving instructions related to a print-out, transmission, memory and recording of a selected document. The operation panel part 16 is a circuit that acquires user's instructions. These instructions include an install of an extended application software (hereinafter referred to simply as "extended application") 400 (FIG. 2) that will be detailed later and an instruction how to use this extended application. In addition, it is possible to allow for inputting and changing each user's information according to the user's instruction. To this purpose, the operation panel 16 may have its own control part and recording media including, for example, a ROM and a RAM in order to perform, in cooperation with the control part 10, a GUI (Graphic User Interface). The install of and how to use the extended application 400 will be detailed later. Further, the operation panel part may be provided with a connection part for connection with a recording medium such as a USB memory or flash memory card, or an external device that incorporates therein a recording medium.

The FAX transceiving part 18 is a circuit that includes, for example, a FAX board for a facsimile transceiving operation. The FAX transceiving part 18 converts an image data set that is read at the document reading part 12, a file that is received by the network transceiving part 15, or the like and facsimile-transmits the resulting drawing. In addition, the FAX transceiving part 19 brings an image data set that is stored on the memory part 19 or a facsimile-received image data into an image forming processing at the image forming part 17 and facsimile-transmits the resulting image data set to an external terminal.

The memory part 19 is a circuit that includes a non-transitory recording medium, a controller therefore, and other elements. The memory part 19 stores thereon one or more control programs and data sets that are essential for the control and operation of the image forming device 1. These control programs and data sets can be provided, for example, in the form of a firmware. In addition, this firmware may include therein a standard firmware in which various control programs and the data sets are brought into combination both of which are for the existing configuration of the image forming device 1. Furthermore, these control programs and data sets, which are executed by the control part 10, are developed when executed. Moreover, the memory part 19 may record various job data sets, image data sets scanned by the document reading part 12, image data sets that are image processed by the image processing part 11, files of printed documents transmitted from other terminals, various files that are read out from connected recording media, data sets of thumbnail images, and the like.

Still further, the memory part 19 may store user's account settings. In addition, the memory part 19 may include a document box area for each user.

The extended device 20 is a device that is not included in the standard configuration of the image forming device 1 and otherwise is a device that is to be connected to the image forming device 1 in an add-on manner. The extended device 20 may be an optional device that copes with a user's surrounding environments and examples of such an optional device include, for example, a finisher for dealing with after treatment of outputted recording papers, user authentication apparatus that performs its original authentication activity, monitor camera that monitors the surrounding environments.

Incidentally, the extended device 20 may be a user environmental device whose examples include an add-on scanner that is different from the document reading part 12, store terminal for use in convenient stores or the like, paper feeding apparatus that is capable of printing out specially formatted papers, control terminal for operating a plurality of activities, and in-factory inspection device.

It is to be noted the control part 10 and the image processing part 11 may be integrated into one unit similar to a CPU having a built-in GPU or a chip-on module package. In addition, the control part 10 and the image processing part 11 may have a built-in RAM, ROM, flash memory, or the like. Further, hereinafter, the hardware resources of the image forming device 1 which include the control part 10 through memory part 19 and which exclude the extended device 20 will be referred to as "standard hardware". Moreover, a hardware resource that is added, via the extended device 20 or the like, to the image forming device 1 will be referred to as an "added hardware"

(Control Configuration of Image Forming Device 1)

Next, with reference to FIG. 2, a control configuration of the 10 image forming device 1 will be described in detail. The image forming device 1 includes a standard application execution part (standard application software execution part) 100, a device control platform 200, and an extended application platform (extended application software platform) 300, which constitute three stage hierarchical structure, and an extended application 400. Execution of the control program of the present disclosure which is implemented by the control part 10 will cause the standard application execution part 100, the device control platform 200, and the extended application platform 300 to be active. In addition, the control part 10, based on the control configuration, is capable of executing the extended application 400, the standard application 120, and an OS (Operating System) 230. In detail, the control configuration allows for execution of the extended application 400 on the extended application platform 300. The standard application execution part 100 is a circuit that executes the standard application 120 that utilizes the hardware resource under the control of the device control platform 200. The standard application execution part 100 includes the standard application 120 installed on the device control platform 200 and services to cope with the device control platform 200.

The device control platform 200 is a circuit that controls all the hardware resources of the image forming device 1 on the OS 230 in order to control each the part on a function-by-function basis. The device control platform 200 is a set of programs and data sets and includes an API (Application Program Interface) as an execution framework for the standard application, a middle ware, a runtime, a linker (hereinafter these are referred to as "APT and the like"), services on the OS 230 (Service, Daemon, hereinafter referred to as "service and the like), an interpreter and JIT (Just in time compiler) which translate and execute a script language and an intermediate language, a virtual machine or the like (hereinafter which will be referred to as "virtual machine and the like"). In addition, the extended application 300 per se runs on the OS 230.

The extended application platform 300 is a circuit that calls the standard application 120 and utilizes a function of the standard application 120, that calls the device control platform 200 and utilizes a function of the device control platform 200, and that manages the extended application 400 and utilizes a function of the extended application 400. In addition, the extended application 300 per se runs on the OS 230.

The extended application 400 is a set of programs and data sets for performing various processes on the extended application platform 300.

In detail, the standard application execution part 100 includes the standard application 120 and a standard application service I/F part (standard application service interface part) 110.

The standard application 120 is a set of programs and data sets for performing various processes on the device control platform 200.

The standard application 120 acquires an instruction from a user and utilized various functions of the image forming device 1 depending on the user's instruction. In addition, the standard application may be written by an intermediate language including, for example, Java (Registered Trademark) or any one of various script languages and the like.

The standard application 120 such as a copy application 121, printer application 122, FAX application 123, or the like is available in factory-installed condition.

The copy application 121, immediately when receiving a copy instruction from the user via the operation panel portion 16, the document reading part 12 reads a document and causes the image forming part 17 to form an image.

The printer application 122, when receiving an order or the like from the external terminal, draws a file of a PDL (Page Description Language) or the like which the network transceiving part 15 receives, and causes the image forming part 17 to form an image. In addition, it is possible to cause the printer application 122, when receives an order or the like from the operation panel part 16 which a user manipulates, to draw a file within a document box of the memory part 19 or the like which the network transceiving part 15 receives, and to cause the image forming part 17 to form an image.

The FAX application 123, when receiving a facsimile transmission order from a user through the operation panel part 16, reads a document using the document reading part 12 and executes a facsimile transmission using the FAX transceiving part 18. In addition, the FAX application 123 is capable of drawing a file or the like which is received from an external terminal and transmitting the resulting drawing using the FAX transceiving part 18. Further, the FAX application 123 makes it possible to cause the image forming part 17 to form an image by processing an image data set that the FAX transceiving part 18 receives. Moreover, the FAX application 123 is allowed to store the received image data set on the document box of the memory part 19.

Incidentally, it is possible to install the standard application 120 after the image forming device 1 is initiated to use. In addition it is also possible for a user to install his/her own standard application 120.

The standard application service I/F part 110 provides a service for utilizing a function of the standard application 120 from outside the application execution part.

The standard application service I/F part 110 may be provided as, for example, the class of Java (Registered Trademark) or the like, or the interface, routine, function, header file, object, library, or the like. In addition, the standard application service I/F part 110 may be provided as a service or the like on the OS 230. The standard application service I/F part 110 also may provide different interfaces to the applications 121, 122, and 123 of the standard application. Further, The standard application service I/F part 110 is capable of establishing an execution, installation, setting modification, deletion and the like of each of the applications 121, 122, and 123 of the standard application.

The device control platform 200 includes a platform service I/F part (platform service interface part) 210, service 220 for controlling each the part, and the OS 230.

The platform service I/F part 210 provides an interface for utilizing the hardware resources from outside the device control platform 200. The platform service I/F part 210 calls the service 220 for controlling each part and causes and causes the same to utilize the hardware resource of the corresponding part of the image forming device 1. The platform service I/F part 210 may be provided as a service or the like on the API or the like or the OS 230. In addition, the platform service I/F part 210 may be provided as a structure of C language, class of C++ language, and others including object, routine, function, header file, object, and library (referred to as "Class or the like". Further, the platform service I/F part 210 may be provided as an intermediate language such as, for example, Java (Registered Trademark).

An each part control service 220 is a service or the like to control each part in a suitable manner.

The each part control service 220, in response to a calling from the platform service I/F part 210, manipulates the image processing part 11, the operation panel part 16, the network transceiving part 15, and the like. In addition, each part control service 220 is capable of calling a copy function, a network scan function, a document box function, and the like. Further, the each part control service 220 is available as a firmware in which different combinations of service or the like and API or the like, and class are prepared for different product lines.

The each part control service 220 includes an image processing function service 221, a device operation service 222, a network communication service 223, and a status management service 224.

The image processing function service 221 is for providing a service related to a creation, conversion, or outputting of a data set for being image processed. The image processing function service 221, operates, for example, to set a resolution, a color, or the like at the document reading part 12, to store an image data set after being read at the document reading part 12 on the memory part 19, and to cause the image processing part 11 to image-process the image data set or document data set on the memory part 19. In addition, the image processing function service 221 displays the image data set that is to be image-processed at the image forming part 17 by accessing files or the like.

The device operation service part 222 provides services for controlling each device. For example, the device operation service part 222 stores an image data set obtained from the document reading part 12 on the memory part 19, displays an image on a browser that appears on an indication area of the operation panel part 16, sends an image data set of the displayed image to the image forming part 17 to form a final image, and causes the FAX transceiving part 18 to facsimile-transmit the image data set stored on the memory part 19. In addition, the device operation service part 222, may perform a control that is a furthermore closer to a device hardware such as, for example, one of motors of the conveyance part 14.

The status management service 224 provides various services for obtaining a status of each part. The status management service 224 obtains the status of each part, the statuses including, for example, mounting status of a paper feeding cassette and the number of remaining papers therein, page jam, a malfunction of each part, a status whether each part operates properly, an existence/non-existence of the extended device 20, and remaining amount of toner for each color. In addition, the status management service 224 is capable of providing various kinds of information to the extended application 400 which is related to the device and which includes device proper information and user information, the device proper information including, for example, an IP address, recognition name, and serial number, the user information including, for example, a set of ID and password assigned to each of normal user and manager, and contact information.

The network communication service 223 provides services that are related to a network transceiving. For example, the network communication service 223, using various protocols such as TCP/IP and UDP, causes the network transceiving part 15 (FIG. 1) to transceive a file or the like with other image forming device, server, and terminal. For example, the network communication service 223 is capable of transceiving a scanned image data set or a file or the like in the document box. It is to be noted that the network communication service 223 is also allowed to transceive an image data set by facsimile-transceiving function of the FAX transceiving part 18, a user authentication if a user authentication exists, and a camera image data set if a camera exists. Furthermore, it is also possible for the network communication service 223 to transceive the status of each part of the image forming device 1 and calling results of the functions of each part.

The OS 230 controls each part of the image forming device 1. Examples of the OS 230 which are available include, for example, general purpose OS such as Linux (Registered Trademark) or the like, an OS for being embedded, a real-time OS. In addition, a schedule management function, such as kernel, core, and the like, of the OS 230 and a set of programs and data sets for managing the base hardware may be incorporated in the firmware.

The extended application platform 300 includes a standard function service 310, an extended function service 320, an install service 330, and an extended application management part 340.

The standard function service 310 is a service or the like to utilize the function of the standard application 120 that corresponds to the standard application service I/F part 110.

The standard function service 310, when receives a calling from the extended application 400 in which each function of each of the standard applications 120 is designated, sends the resulting or designated function to the standard application service I/F part 110 for an execution of the preceding function of the concerned standard application 120.

The extended function service 320 is a service or the like for utilizing hardware resources that correspond to the platform service I/F part 210.

The extended function service 320, when receives a calling from the extended application 400 in which each function of each of the standard applications 120 is designated, sends the resulting or designated function to the platform service I/F part 210 for an execution of the preceding function of the concerned part.

The extended application management part 340 manages and implements an extended application 400 that is capable of calling the standard function service 310 and the extended function service 320. The extended application management part 340, using the API of the extended application platform 300, manages an installation of the extended application 400, an activation thereof which causes the image informing device 1 to be ready for operation, an execution of the extended application 400, a termination of executing the extended application 400, an uninstallation thereof, and the like (hereinafter, such processing will be referred to as "management of the life cycle of the extended application 400").

In addition, the extended application management part 340, when receiving authentication information from, for example, the operation panel part 16 and the extended device 20, so activates the extended application 400 as to be ready for operation.

The install service 330 is a service or the like to add a function, the standard function service 310 does not provide, to the extended application platform 300 and the OS 230 without having to change the structure of the firmware stored in the memory part 19.

The added function by the install service 330 will be detailed later.

The extended application 400 is made up of a program of an application and data sets that are adapted to be executed on the extended application platform 300. It is possible for extended application 400 to call the standard function service 310 to utilize the function of the standard application 120, to call the extended function service 320 to utilize the function of each part of the image forming device 1, or to call the install service 330 to install the additional function to the OS 230. For this reason, the extended application 400 allows the image forming device 1 to execute various processing that the image forming device 1 alone fails to execute.

In addition, the extended application 400 may be constructed by a combination of an execution file that runs on the extended application platform 300 and various data sets including class information. In such a case, as the execution file of the extended application 400, for example, the files of various script languages, the file of the intermediate language of Java (Registered Trademark), and the binary file of the applications such as the execution file of "NATIVE" are available. The extended application 400 may be programmed, in a case of less restriction in resources including, for example, processing speed and required memory capacity, by the file of the script language or the file of the intermediate language. In addition, the extended application 400 may be programmed, if there is a restriction in resources, by C language or C++ language that are excellent in performance, an assembler language, or the like. The extended application 400 is allowed to include additionally necessary data sets.

Examples of the extended application 400 include an OCR (Optical Character Recognition), monitor camera application, practical application for forming water mark, issuing a debit note, managing a list of employee, managing bills, managing contracts, managing business cards, creating PDF forms, and managing groups. The extended application 400 may be an installer application, another management application, and the like, the installer application being for adding or changing a device driver 350 (FIG. 3), an additional hardware function I/F part 311 and the like.

In addition, plurality of the extended applications 400 may be provided. The extended application 400 may be installed from the image forming device 1 or another terminal to be stored on the memory part 19. Alternatively, the extended application 400 may be stored on an external memory device. An execution capability of the extended application 400 may be selected depending on the proper information of the image forming device 1. In addition, in a case of installing or executing each extended application 400, the extended application 400 may be required of the "activation" that is corresponded to the image forming device 1 for readily operation thereof. It is to be noted that different extended applications may be installed in different image forming devices 1.

<Detailed Configuration of the Extended Application Platform>

Figure 3:
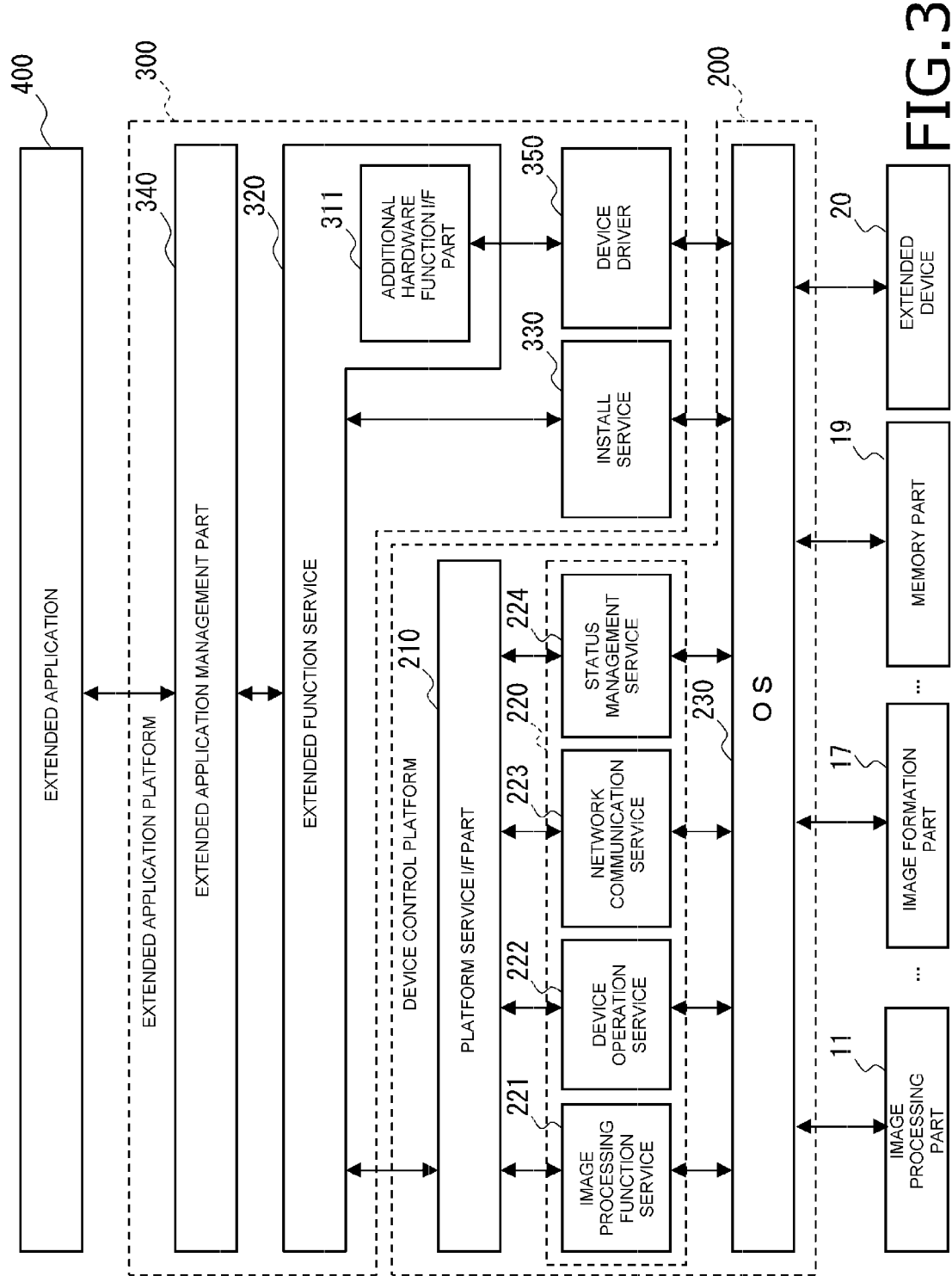
FIG. 3 illustrates a control configuration when an extended application shown in FIG. 2 copes with an extended device.
Figure 4:
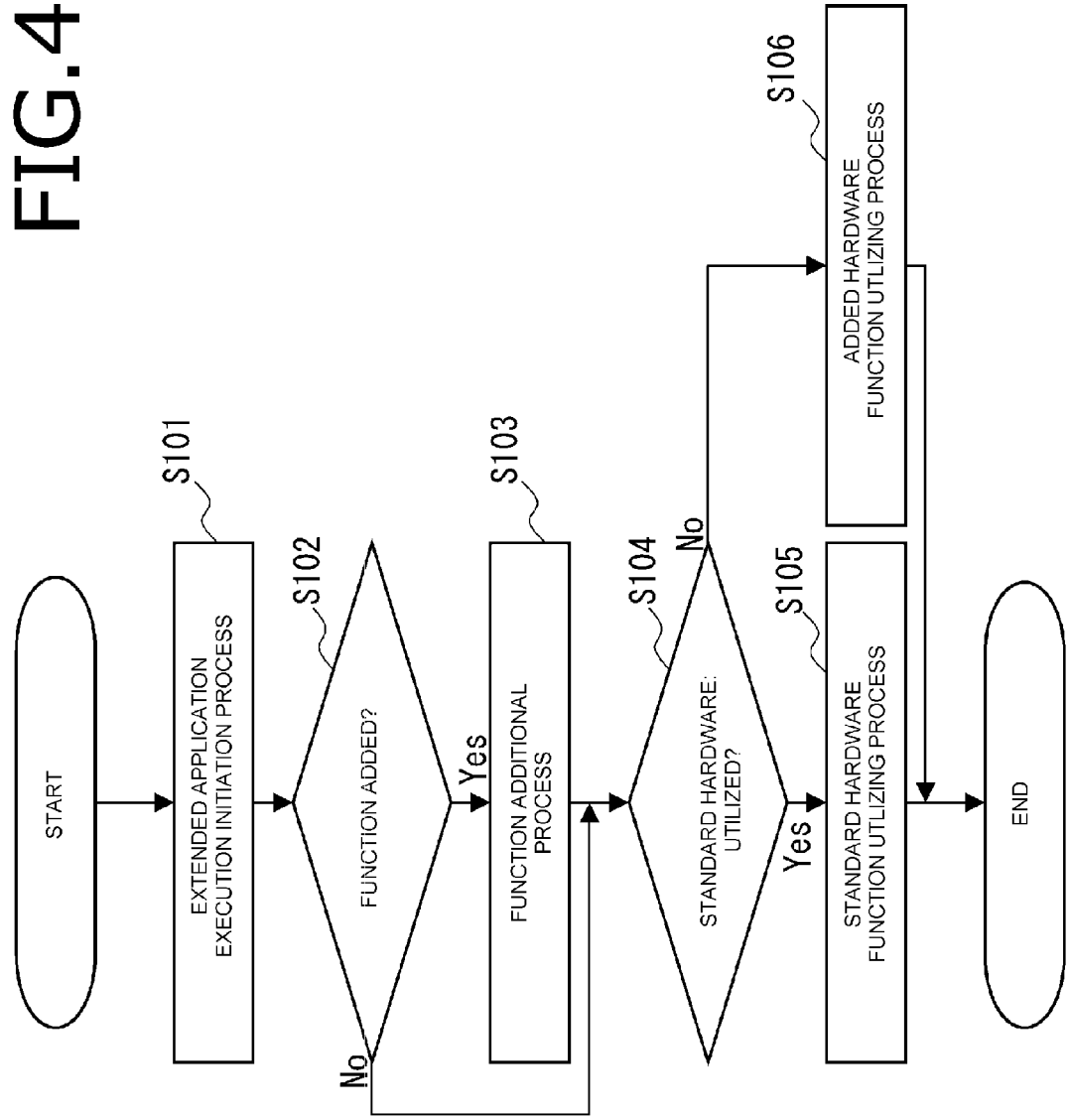
FIG. 4 illustrates steps of a function addition utilizing procedure according to the exemplary embodiment of the present disclosure.

Next, with reference to FIG. 3, a control configuration will be detailed when, for example, a function is added thereto that copes with the extended device 20.

In FIG. 3, the install service 330 has installed an additional hardware function I/F part 311 that copes with the extended device 20 into the extended function service 320 and has also installed a device driver 350.

The install service 330 adds an interface to the extended function service 320, the interface being the additional hardware function I/F part 311 or the like that the standard function service 310 fails to provide. In addition, the install service 330 installs a control program such as the device driver 350 that copes with the OS 230 and the extended application platform 300 or the script. In such a case, the install service 330 makes only an additional change without changing the standard firmware that is stored in the ROM, flash memory, and the like.

Further, the install service 330 is capable of changing the contents of a set file of the OS 230. In such a case, the install service 330 may, for example, create, change, or delete the file that is stored on a directory such as "var". Incidentally, it is possible for the install service 330 to add a function by installing an extended function service 320 or OS 230 that cope with a function that is not related to the extended device 20.

Moreover, the install service 330 is capable of, for example, changing or updating the firmware wholly or partially.

The additional hardware function I/F part 311 is an interface that is intended to utilize an function that copes with the extended device 20 that is a hardware added by the install service 330. The additional hardware function I/F part 311 provides the interface that utilized mainly a hardware resource of the extended device 20. That is, the additional hardware function I/F part 311 calls the device driver 350 in order to allowing for the utilization of hardware resource such as the extended device 20 or the like. The additional hardware function I/F part 311 may be provided as, for example, a service or class.

In addition, the additional hardware function I/F part 311 is added to the extended function service 320 by the install service 330 when, for example, the extended application 400 that copes with the extended device 20 is executed.

The device driver 350 is a control program that is adapted to be executed on the extended application platform 300 for utilizing the function of the extended device 20.

In a case where the image forming device 1 is connected with the extended device 20 that is in the form of a finisher, a user identification part using IC card or biometric authentication, or a camera, the device driver 350 calls, via the OS 230, a function of stapling, bookbinding, or the like, a function of user identification by the concerned identification part, or a function of camera image acquisition, visual line detection, or the like.

In addition, the device driver 350 is added to the extended application platform 300 by the install service 330. The device drive 350 may be created by C language, C++ language, assembler language, or the like, that are performance oriented languages. The device driver 350 is allowed to include a control program such as script language or the like.

Incidentally, the device driver 350 may be added by utilizing a function of the OS 230 or may be added to the OS in a direct manner.

Figure 2:
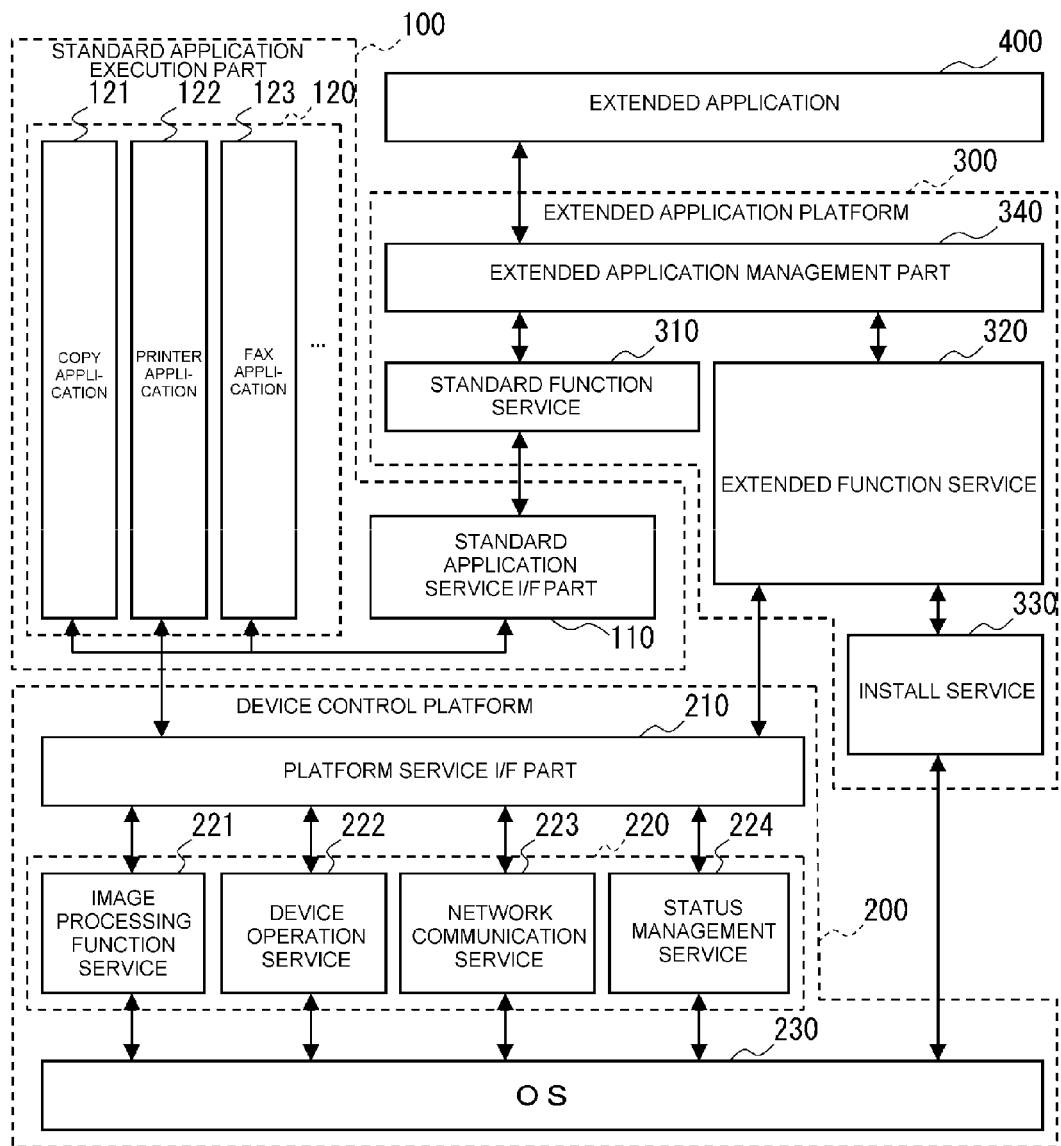
FIG. 2 illustrates a control configuration of the image forming device shown in FIG. 1.

It is to be noted that the function of each part that is shown in FIG. 2 and FIG. 3 may be realized by the control part 10 that reads out the control program from the HDD of the memory part 19 or the flash memory and executes the resulting control program.

<Additional Function Utilization Processing by the Image Forming Device 1>

Next, with reference to FIG. 4 through FIG. 7, a description will be made on an additional function utilization processing by the image forming device 1 according to the exemplary embodiment of the present disclosure.

The additional function utilization processing according to the present embodiment executes the extended application 400 to install the additional hardware function I/F part 311 and the device driver 350. In addition, the additional function utilization processing according to the accesses the extended device 20 to utilize the function thereof by using the additional hardware function I/F part 311 and the device driver 350.

In the additional function utilization processing according to the present embodiment, the control part 10, by cooperating with each part for utilizing the hardware resources, executes the program that is stored in the memory part 19.

Hereinafter, with reference to a flowchart shown in FIG. 1, the additional function utilization processing will be detailed in a step by step manner.

(Step S101)

First of all, the extended application management part 340 executes an extended application execution initiation process.

The extended application management part 340, in a case where the extended application 400 installed from the connected memory device, server, terminal, or the like is ordered to execute by a user, initiates an execution of the resulting extended application 400.

Incidentally, it is possible for the extended application management part 340 to execute the extended application 400 without an installation thereof from the connected memory device or the like.

(Step S102)

Next, the install service 330 determines whether or not adding a function is to be implemented. The install service 330 gives a result "YES" if the extended application 400 adds, using an installer application or the like, a function to cope with the extended device 20 or the like and otherwise gives a result "NO".

If the result is "YES", the install service 330 causes the processing to go to step S103.

If the result is "NO", the install service 330 causes the processing to go to step S104.

(Step S103)

In a case of implementing the addition of function, the install service 330 implements the additional function utilization process.

Figure 5:
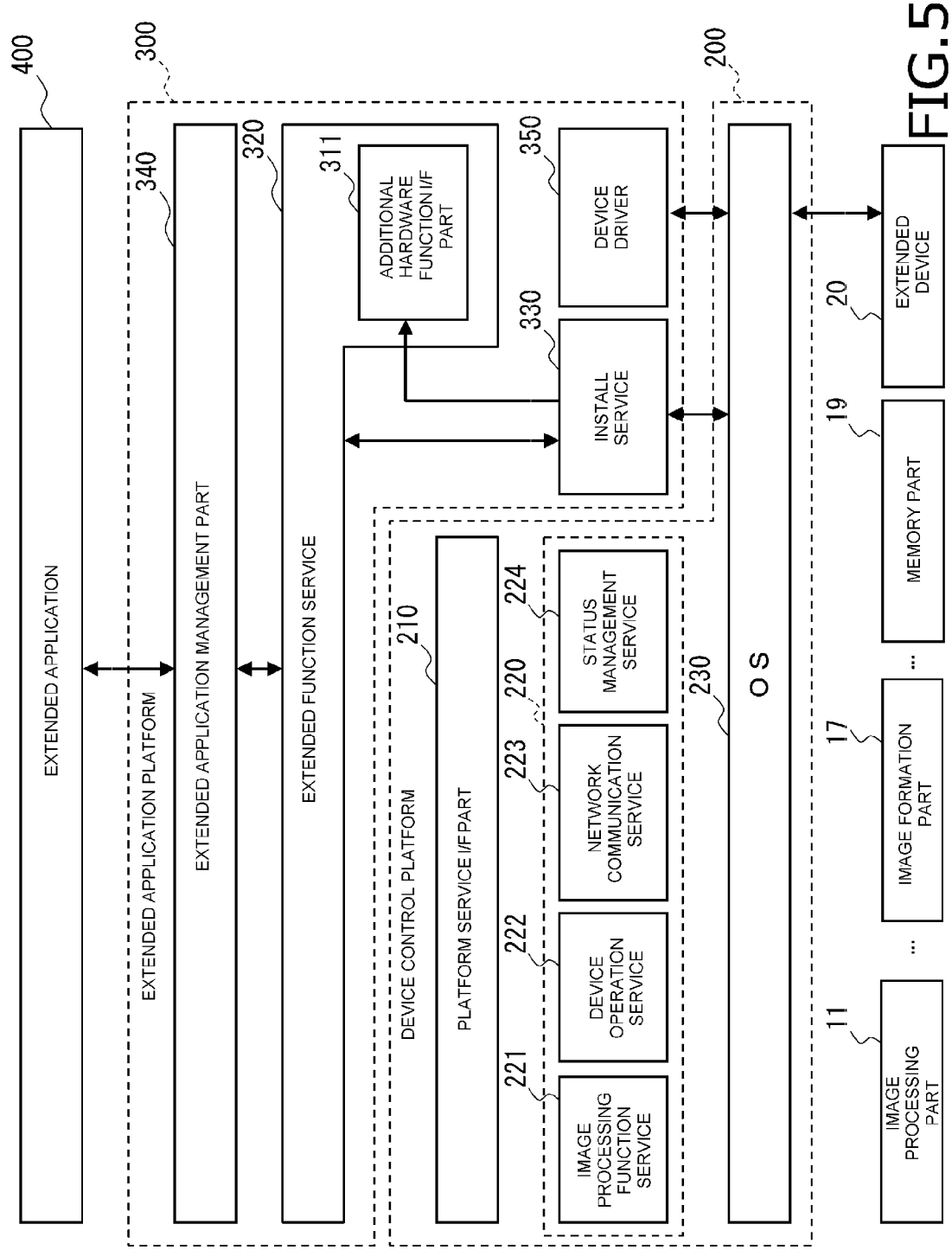
FIG. 5 illustrates the FIG. 4—illustrated function addition utilizing procedure.

According to FIG. 5, in a case where the install service 330 installs the device driver 350 or the like, the install service 330 obtains the additional hardware function I/F part 311 from the extended application 400 via the extended management part 340 and the extended function service 320 and sets the resulting additional hardware function I/F part 311 in the extended function service 320. At this stage, it is possible for the install service 330 to implement such a setting without rewriting the standard firmware.

In addition, install service 330 sets the device driver 350, using the function of the OS 230 or the like, in the extended application plat form 300. At this stage, the install service 330 may confirm whether the extended device 20 exists or not. Thereafter, the installer service 330 changes the setting of the OS 230.

These operations allows for utilization of the function of the extended device 20.

In addition, the install service 330 may add a function that is not in direct association or relationship with the extended device 20 to the extended service 320 and/or the OS 230.

(Step S104)

At step S104, it is determined whether or not the extended function service 320 should call the functions of the standard hardware of the image forming device 1. In a case where the extended function service 320 should call the function of each part of the standard hardware of the image forming device 1 for the utilization thereof, the result of the determination is YES and otherwise i.e., in a case of a utilization of the additional hardware the result is NO.

If the result is YES, the extended function service 320 causes the processing to go to step S105.

IF the result is NO, the extended function service 320 causes the processing to go to step S106.

(Step S105)

In a case of calling the functions of the standard hardware, the extended function service 320 and the platform service I/F part 210 implements the standard hardware function utilizing process.

Figure 6:
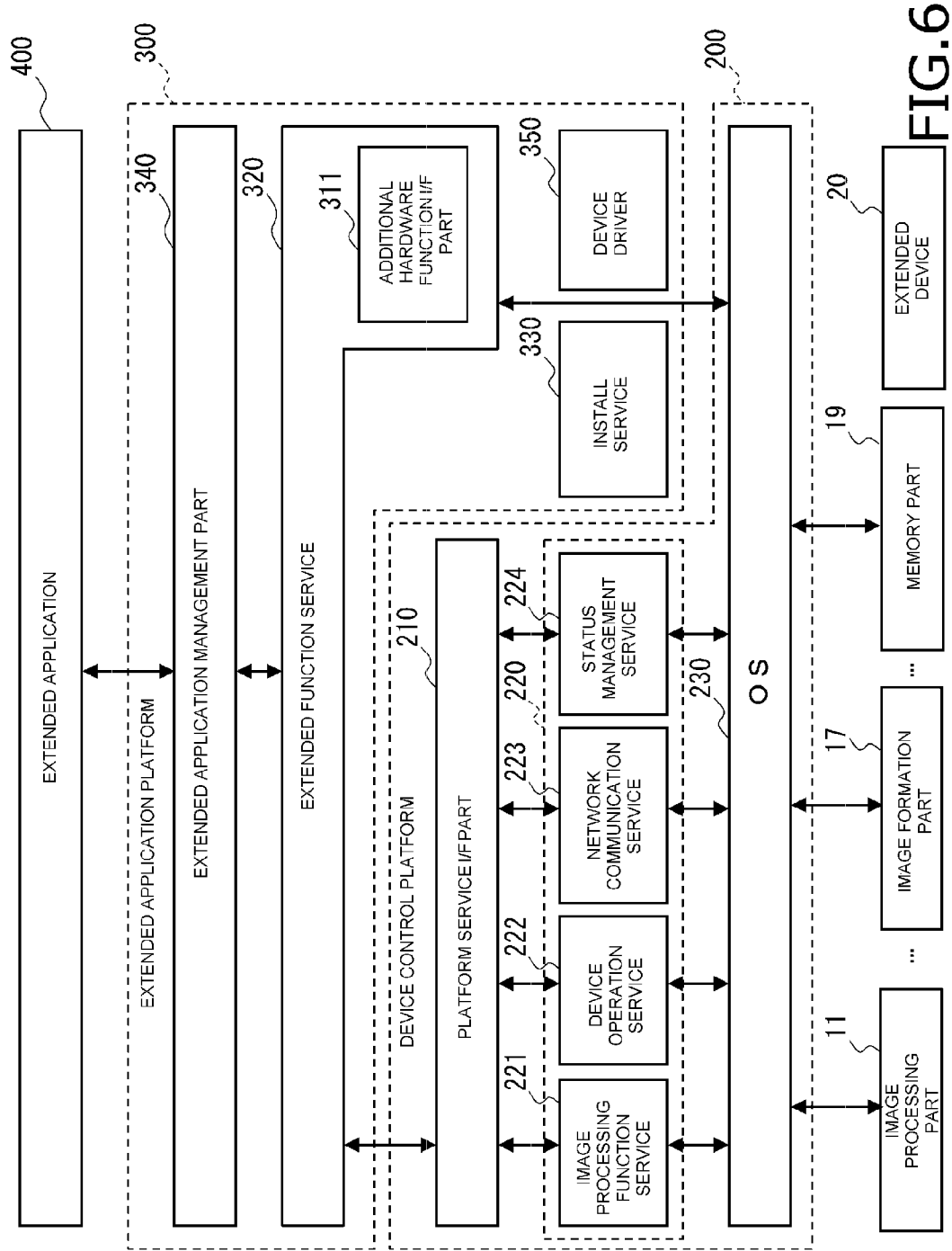
FIG. 6 illustrates a standard hardware function utilization procedure that is illustrated in FIG. 4.

As seen from FIG. 6, if the extended function service 320 is called via the extended application management part 340 from the extended application 400 and concurrently if this is a case of the standard hardware, the extended function service 320 informs this to the platform service I/F part 210.

The platform service I/F part 210, when being called from the extended function service 320 of the extended application platform 300, calls the functions of the control service 220 for each part which correspond to the previously called functions to utilize the hardware resources of the image forming device 1.

In an exemplary case of calling the function corresponding to the image processing function service, the platform service I/F part 210 implements an execution of a specified image processing function after acquiring an image data set or the like from the extended application 400, stores an image data set that results from reading a document by the document reading part 12 (FIG. 1), or reading the stored image data set from the memory part 19. In this case, the platform service I/F part 210, when calling, for example, the function corresponding to the image processing function service 221, causes the image processing function service 221 to execute processing that include, for example, magnification of the image data set, reduction of the image data set, color change of the image data set, rotation of the image data set, noise reduction from the image data set, format conversion of the image data set, character racemization, and watermark recognition. In addition, the platform service I/F part 210, when calling, for example, the function corresponding to the device operation service 222, causes the device operation service 222 to execute processing that include, for example, image displaying on the operation panel part 16, control of the FAX transceiving part 18, driving of the conveyance part 14. Further, the platform service I/F part 210, when calling, for example, the function corresponding to the network communication service 223, causes the network communication service 223 to execute processing that include, for example, transceiving of a file using various protocols, streaming, and transceiving of an authentication data set which are to be by way of the network transceiving part 15. Furthermore, the platform service I/F part 210, when calling, for example, the function corresponding to the status management service 224, acquires a status of each part and various kinds of information related to the device, and informs the resulting information items to the extended application 400.

Incidentally, the extended function service 320 is capable of calling, without by way of the platform service I/F part 210, the function of each part by way of the OS in a direct manner.

In addition, the extended function service 320 may call and execute an additional function other than the additional hardware function.

Thereafter, the platform service I/F part 210 terminates the additional function utilization processing.

(Step S106)

In a case of calling the function of the additional hardware, the additional hardware function I/F part 311 of the extended function service 320 executes an additional hardware function utilization process.

Figure 7:
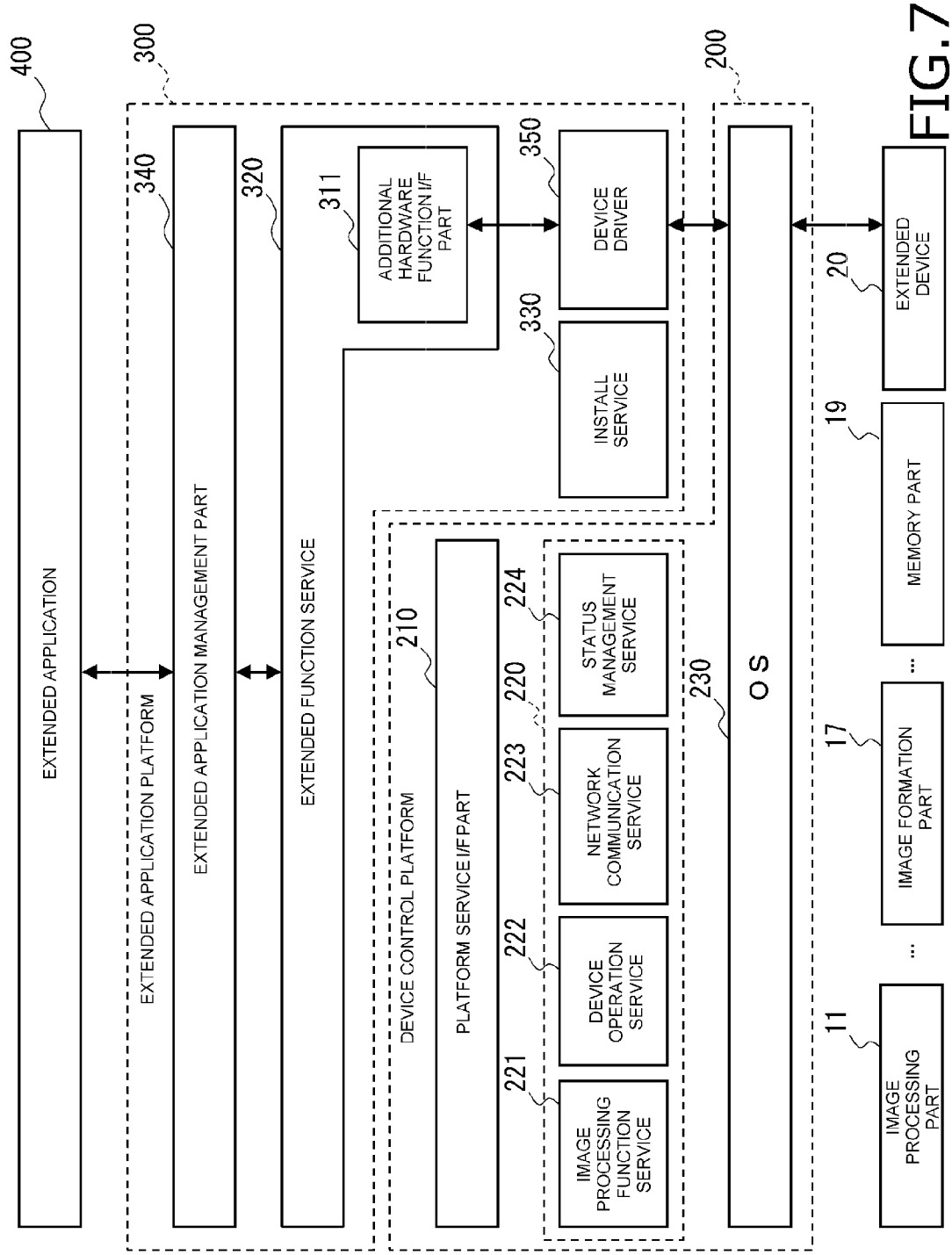
FIG. 7 illustrates an additional hardware function utilization procedure that is illustrated in FIG. 4.

As seen from FIG. 7, if the extended function service 320 is called via the extended application management part 340 from the extended application 400 and concurrently if this is a case of the additional hardware, the extended function service 320 executes the additional hardware function I/F part 311.

The additional hardware function I/F part 311 calls, using the device driver 350, the function of the extended device 20 via the OS 230. In a case where the image forming device 1 is connected with the extended device 20 that is in the form of a finisher, a user identification part using IC card or biometric authentication, or a camera, the additional hardware function I/F part 311 calls, via the OS 230, a function of stapling, bookbinding, or the like, a function of user identification by the concerned identification part, or a function of camera image acquisition, visual line detection, or the like.

Thus, the additional function utilization processing according to the present exemplary embodiment terminates.

The aforementioned configuration provides the following effects.

A typical platform has to be fully reformed in order to add a function that copes with an added hardware or the like.

For changing a platform, the configuration of the existing platform must be well-known. In addition, changing the platform will also affect correspondingly its associated standard function service. For these reasons, it is very difficult to grasp how the entire platform is affected and therefore is very difficult to maintain the quality of the entire platform. In fact, for the maintenance of the quality of the entire platform, it is requested to evaluate the added function as well as the existing function, thereby increasing the number of man-hours.

As a result, adding a function to an existing platform will require an expensive development cost.

On the contrary, the image forming device 1 according to the present exemplary embodiment is characterized to include, the device control platform 200 that manages the hardware resources on the OS 230, the standard application execution part 100 that executes the standard application 120 for utilizing the hardware resources under the control of the device control platform 200, the extended application platform 300 that is made up of the standard function service 310 that allows for utilizing the function of the standard application 120 coping with the standard application service I/F part 110 from the standard application 120 executed from the standard application execution part 100, the extended function service 320 that allows for utilizing the hardware resources coping with the platform service I/F part 210, and the extended application management part 340 that manages the extended application 400 that is capable of managing and executing the standard function service 310 and the extended function service 320 and causes the extended application to execute, and the install service 330 that, for allowing for the utilization from the extension application platform 300, adds, without having to change the configuration of the standard firmware, the interface such as the additional hardware function I/F part 311 or the like that copes with the function that the standard function service 310 fails to provide to the extended function service 320.

With thus configuration, it is possible, without having to change the device control platform 200 that copes with the existing function of the image forming device 1, to add a new control processing system involving an addition of functions. By using the install service 330, these functions are installed into the image forming device 1 and are usable from the extended application 400.

Thus, it is possible to add or expand the functions without having to chance the existing device control platform 200, which causes the quality of the image forming device 1 to maintain or improve. In addition, the device control platform 200 causes the platform service I/F part 210 to utilize the existing functions as they are and therefore such a utilization can be made without having to be familiar with the inner control of the device control platform 200. Further, it is possible to devote to develop a function that is intended to cope with the additional hardware function I/F part 31. Thus, it is possible to make the development of an additional function effective and to reduce the developing time.

Furthermore, no changing of the existing device control platform 200 will reveal the resulting affected scope, which makes it possible to conduct a debug, test, or the like that is focused on the additional function, thereby reducing the evaluation time. Similarly, it is possible to add a function without having to change the standard firmware, which results in that reducing cost required for conducting a test or the like that is involved in the renewal of the standard firmware.

That is to say, facilitating the development of a function to be added, improving the developing effectiveness, and reducing the developing time will reduce the developing cost.

Still, it is not required to renew the entire firmware whenever the function is added, which results in that ease of use for a user will be improved.

In addition, the hierarchically configured extended application platform 300 allows utilizing the function of the standard application 120 or the hardware resource corresponding to each the part from the extended application 400.

Thus, it is easy to attain a customization for modifying the configuration depending on the user environments or circumstances, thereby providing an image forming device with a reduced cost.

That is to say, in a case where a mere utilization of the function of the standard application 120 makes it possible to develop the image forming device 1 according to the present exemplary embodiment, such a development will be attained in a short period. On the other hand, in a case of a customization in which a direct control of the hardware resources is required, it is possible to call the function of each the part by bypassing the standard application 120. In such a way, the image forming device 1 according to the present exemplary embodiment is capable of coping with different users' demands by causing the hierarchically configured extended application platform 300 to coordinate the avoidable customizing levels between the users. Thus, coping with the avoidable customizing levels between the users becomes easy. In addition, expanding the hierarchized service makes it possible to show clearly a corresponding range of the customization, thereby facilitating the development of the extended application 400. Further, it is not need to prepare SDK (Software Development Kit) and NDK (Native Development Kit) that are different in level.

Moreover, the image forming device 1 according to the present exemplary embodiment is based on the software architecture by which the platform is the hierarchically configured and therefore is allowed to be developed in a short period with a coping with a new technology that the user requests. In summary, it is possible to provide, inexpensively and timely, an image forming device on which a new technology that the user requests is reflected and which is provided with an optimal performance and function.

In addition, the image forming device 1 according to the present exemplary embodiment is to make it possible for the additional hardware function I/F part 311 added to the extended function service 320 by the install service to utilize the function coping with the extended device 20 i.e. the added hardware and is characterized in that the install service 330 also installs the device driver 350 coping with the extended device 20 into the extended application platform 300.

Such the configuration will make it possible to develop the extended application 400 in an easy manner that is for utilizing the function coping with the device that is not included in the standard configuration or that is adapted to be added thereon. Thus, it is possible to reduce a required cost for developing an optional device or a device adapted for user's environments, and also to reduce a developing time which will result in taking an action in a short period for coping with the user's environments.

In the aforementioned description with respect to the exemplary embodiment, as an example of adding the additional hardware function I/F part 311, the install service 330 is described as the interface that copes with the extended device 20. However, the interface that the additional hardware function I/F part 311 adds is not limited to the above and therefore various services that are out of association with the extended device 20 and interfaces added by such services are available.

With such the configuration, it is possible to add a function that is not provided by the device control platform 200 in which the standard hardware is used.

Also, the install service 330 is allowed to install both an interface that copes with the existing standard hardware and test driver.

Such a configuration makes it possible to, for example, access the standard hardware from a specific extended application 400 by means of a specific method without having to changing the standard hardware. In addition, it is possible to establish a concurrent existence of device drivers and services that are different in version and therefore to create an extended application 400 based on a specific version of a specific device driver. For this reason, it is possible to attain reductions of, for example, an evaluating time and developing period, and a developing cost.

Although, in the description of the aforementioned exemplary embodiment, each part such as the network transceiving part 15, the image forming part 17, or the FAX transceiving part 18 is explained as having a standard configuration, each part may be an additional hardware such as an optional device or the like. In such a case, the install service 330 may install the additional hardware function I/F part 311 and the device driver 350 that cope with each the part. In addition, alternatively, the additional hardware function I/F part 311 and the device driver 350 that are for each the part may be incorporated in the standard firmware.

These configurations will make it possible to provide line of device products that are adapted to be modified in a flexible manner with a restricted developing cost.

In addition, the extended application may include a "general application" that is adapted for calling and realizing each the function of the image forming device 1 and a "management application".

Such a configuration will make it possible for the extended application 400 to make controlling the image forming device 1 flexible and concurrently to enhance a security thereof.

In the aforementioned description with respect to the present preliminary embodiment, the standard application 120 and the extended application 400 are defined as being previously stored on the memory part 19.

However, it is possible to store the standard application 120 and the extended application 400 on the memory part 19 after installing the same thereon from an external device connected to the image forming device 1, a memory device connected to an external server, an external terminal connected via the network, or the like. In such a case, the concerned the standard application 120 and extended application 400 are so set as to be usable only from the user conducted the installation, the image forming device 1 or the terminal.

Such a configuration will realize a functional extension in a flexible manner and reduce a management cost.

In addition, it is possible to store, on the memory part 19, one or more applications that are different from the standard application 120 and the extended application 400 in kind. For example, a Web application and the like (hereinafter referred to as "external application") other than the extended application 400 and user prepared data sets may be stored on the memory part 19. The external application may be called by a user's instruction of the operation panel part 16 of the image forming device 1 and thereafter is read for being executed.

Such a configuration makes it possible to use the extended application platform selectively for different purposes in a flexible manner, thereby increasing the user-friendly operation.

It is to be noted that the present disclosure is applicable to various information processing devices other than the image forming device. That is to say, a configuration such as, for example, a network scanner, or a server that is connected with a separate scanner via a USB has a qualification to be applied with the concept of the present disclosure. Further, the concept of the present disclosure is applicable to an information processing device in which an application is installed and whose examples include, for example, a PC, smartphone cell phone, business machine, industrial machine.

It should be noted that the configuration and operation of the aforementioned exemplary embodiment are exemplary and therefore it is readily understood for those skilled in the art that variations of the exemplary embodiment will be implemented without departing from the scope of the spirit of the present disclosure.

What is claimed is:

1. An image forming device comprising:
a control circuit, the control circuit including
a device control platform that manages a standard hardware resource on an operating system;
a standard application execution part that executes a standard application utilizing the standard hardware resource under the control of the device control platform; and
an extended application platform including
a standard function service that allows for utilizing a first function of the standard hardware resource when the standard application is executed by the standard application execution part,
an extended function service that allows for utilizing the standard hardware resource and an added hardware resource, the added hardware resource being utilized by the extended application, and
an extended application management part that manages and executes an extended application that is capable of calling the standard function service and the extended function service, and
an install service adding, without having to change a configuration of a standard firmware, an interface that serves as a second function, wherein the second function is a function of the added hardware resource that is not available from the standard function service, to the extended function service in order that the resulting extended function service is available from the extended application platform, wherein the interface that is added to the extended function service by the install service is an additional hardware function interface that allows for utilizing the second function and the install service also installs a device driver that copes with the added hardware, wherein when the extended application management part executes the extended application to call the first function, (i) the extended function service informs the device control platform of the called first function, and (ii) the device control platform allows for utilizing the standard hardware, and wherein when the extended application management part executes the extended application to call the second function, (i) the extended function service executes the additional hardware function interface, and (ii) the additional hardware function interface allows for utilizing the additional hardware by the installed device driver.

2. An image formation method that is implemented on an image forming device including a standard hardware resource, the method comprising:

managing, using a first platform, the standard hardware resource on an operating system;

executing, using the first platform, a standard application that utilizes the standard hardware resource being managed;

managing and executing an extended application that allows for utilizing the standard hardware resource by calling a first service that allows for utilizing a first function of the standard hardware resource when executing the standard application, wherein the extended application is managed and executed by a second platform and the first service is included in the second platform;

adding and utilizing an interface and a device driver, without having to change a configuration of a firmware, in order to cope with a second function, wherein the second function is a function of an added hardware resource that is not available from the first service; and executing the extended application to call the second function through a second service included in the second platform, wherein the interface is an additional hardware function interface that allows for utilizing the second function and the device driver copes with the added hardware, wherein when the extended application is executed to call the first function, (i) the second service informs the first platform of the called first function, and (ii) the first platform allows for utilizing the standard hardware, and wherein when the extended application is executed to call the second function, (i) the second service executes the added interface, and (ii) the added interface allows for utilizing the additional hardware by the installed device driver.

3. A non-transitory computer readable recording medium storing a control program executable by an image forming device, the control program causing the image forming device to:

manage, using a first platform, a standard hardware resource on an operating system;

execute, using the first platform, a standard application that utilizes the standard hardware resource being managed;

manage and execute an extended application that allows for utilizing the standard hardware resource by calling a first service that allows for utilizing a first function of the standard hardware resource when executing the standard application, wherein the extended application is managed and executed by a second platform and the first service is included in the second platform;

add and utilize an interface and a device driver, without having to change a configuration of a firmware, in order to cope with a second function, wherein the second function is a function of an added hardware resource that is not available from the first service; and execute the extended application to call the second function through a second service included in the second platform, wherein the interface is an additional hardware function interface that allows for utilizing the second function and the device driver copes with the added hardware, wherein when the extended application is executed to call the first function, (i) the second service informs the first platform of the called first function, and (ii) the first platform allows for utilizing the standard hardware, and wherein when the extended application is executed to call the second function, (i) the second service executes the added interface, and (ii) the added interface allows for utilizing the additional hardware by the installed device driver.

* * * * *